H. H. SCHUETTE.
GRAIN CLEANING MEANS FOR THRESHING MACHINES.
APPLICATION FILED APR. 17, 1916.
1,230,437. Patented June 19, 1917.
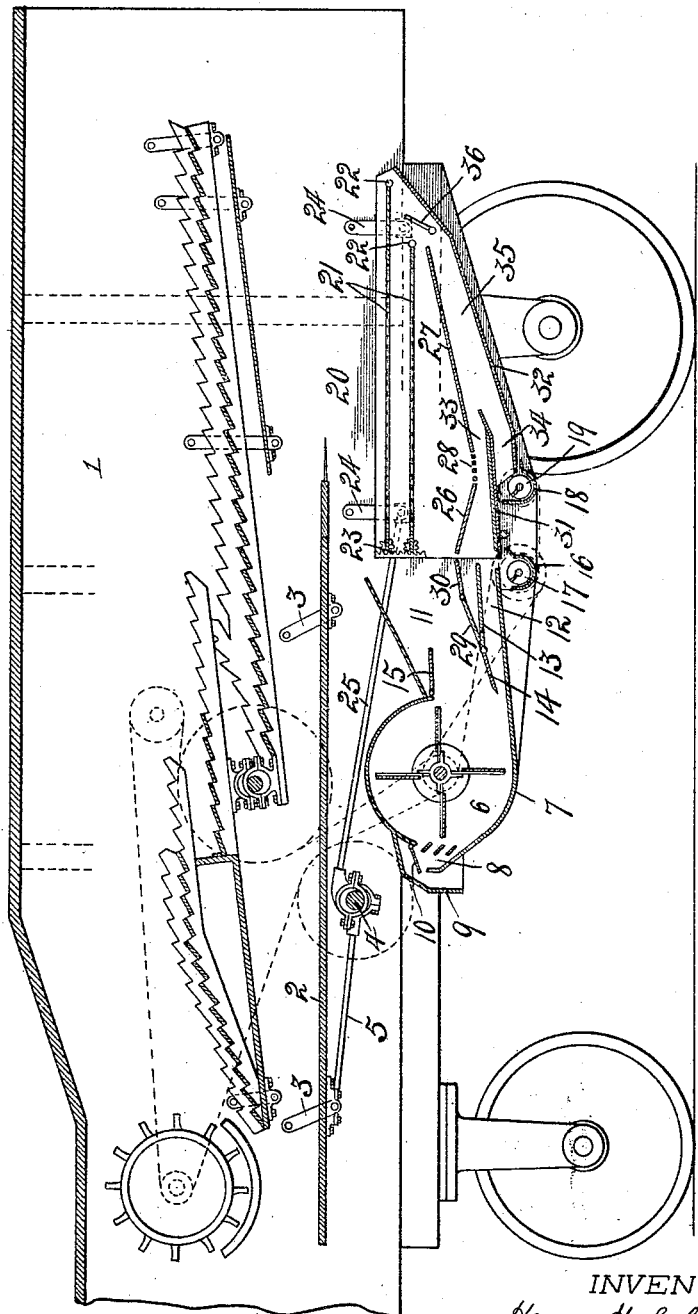
INVENTOR
Henry H. Schuette,
By Owen, Owen & Cranston,
His attys.

UNITED STATES PATENT OFFICE.

HENRY H. SCHUETTE, OF NAPOLEON, OHIO.

GRAIN-CLEANING MEANS FOR THRESHING-MACHINES.

1,230,437. Specification of Letters Patent. Patented June 19, 1917.

Application filed April 17, 1916. Serial No. 91,756.

*To all whom it may concern:*

Be it known that I, HENRY H. SCHUETTE, a citizen of the United States, and a resident of Napoleon, in the county of Henry and State of Ohio, have invented a certain new and useful Grain-Cleaning Means for Threshing-Machines; and I do hereby declare the following to be a full, clear, and exact description of the same, such as will enable others skilled in the art to which it appertains to make and use the same, reference being had to the accompanying drawings, and to the characters of reference marked thereon, which form a part of this specification.

This invention relates to threshing machines, and particularly to the grain cleaning and separating means thereof.

The object of my invention is the provision of improved mechanism of the character described, whereby to enhance the practicability and commercial value thereof. A further object of my invention is to improve on the mechanism described and claimed in my former application for United States Letters Patent Serial No. 59,014, filed November 1, 1915.

A further object of my invention is to so improve mechanisms of the class described as to cause all chaff, dirt or foreign matter which is blown from the grain during the cleaning process to be discharged from the machine with the straw instead of a part thereof discharging into the open from the bottom portion of the machine.

The invention is fully described in the following specification, and while, in its broader aspect, it is capable of embodiment in numerous forms, a preferred embodiment thereof is illustrated in the accompanying drawing, which is a central vertical longitudinal section of the portion of a machine embodying the invention.

Referring to the drawing, 1 designates the frame of the machine, which frame may be of any suitable design and construction, and 2 the customary grain-bottom thereof. The grain-bottom 2 is supported for forward and backward shaking movements within the frame 1 by sets of rocker arms 3, carried by the respective sides of the machine frame. A shaft 4, which is journaled transversely of the machine frame below the grain bottom 2, has eccentric rod connection 5 with the rear end portion of the grain-bottom, whereby longitudinal shaking movements are imparted to said bottom by a rotation of said shaft.

A blast-fan 6 is located within a circular housing 7 below the central portion of the grain-bottom 2, and said housing is provided at its rear side with an air inlet passage 8, which is inclosed by an external flange or shed 9, which directs the air current upward before passing in a downward direction through said opening into the interior of the housing 7. The inlet opening 8 is controlled by an adjustable gate 10. The housing 7, at its forward end, is provided with a main blast outlet 11 and below the same with an auxiliary blast outlet 12, said outlet being divided by a partition member 13, which is arranged to coöperate with the forwardly extending bottom portion of the housing 7 to form the shallow passage 12. An adjustable gate 14 is provided at the forward end of the partition 13 to control the entrance to the passage 12, and a similar adjustable gate 15 is hinged to the upper wall of the passage 11 adjacent the entrance end thereof and is adapted to control the quantity of air discharged through said passage.

A transversely disposed grain-trough 16 is mounted below the forward end of the bottom wall of the passage 12, the forward side portion thereof extending in advance of the end of said passage wall, as indicated in the drawing. A grain-auger 17 is mounted in the trough 16. The tailing-trough 18 of the machine is mounted transversely of the frame 1 slightly in advance of the trough 16 in substantially the horizontal plane thereof and has a tailing-auger 19 mounted therein.

Mounted within the frame 1 in advance of the air blast passages 11 and 12 is a shaker-frame 20 which carries one or more riddles or sieves 21 beneath the forward end of the grain-bottom 2 to catch grain as it discharges therefrom. Each of the riddles 21 is preferably pivoted at its forward end to the shaker-frame, as at 22, and has its rear end in vertically adjustable connection with the shaker-frame through the medium of a rack-bar and pinion connection 23, thus enabling the rear end of either sieve to be raised or lowered in position to intercept a greater or less portion of the air blast discharging through the passage 11. The shaker-frame 20 is carried for shaking or swinging movements longitudinally of the frame 1 by a plurality of sets of rocker arms 24, which are pivotally suspended from respective sides of the machine frame. A rod 25 extends from the shaker frame 20 and has eccentric connection with the shaft 4 whereby a rotation of the said shaft imparts shaking movements to the shaker-frame.

The shaker-frame 20 is provided below the riddles 21 with partitions 26 and 27, which are placed in successive order longitudinally of the frame with their adjacent ends in spaced relation, the space therebetween being provided with grate-bars 28 to permit a passage of the grain therethrough. The partitions 26 and 27 are preferably inclined in opposite directions from the part 28 with the rear edge of the part 26 terminating above the lower partition 13 which forms the top wall of the blast passage 12, and with the forward end of the part 27 terminating in slightly spaced relation to the bottom of the lower sieve or riddle 21. A fixed partition part 29 projects forward on an incline from the rear end portion of the partition 13 and is provided at its forward end with a vertically adjustable hinged gate 30, which may be adjusted to place its free end either above or below the rear end of the partition part 26, as it may be desired to control the passage of the air blast through the frame 20.

The shaker-frame 20 is provided at its rear end with what may be termed a grain-bottom 31, which is disposed below the partition part 26, the grating 28 and the rear end of the partition part 27 in vertically spaced relation thereto and terminates at its rear end in slightly forwardly spaced relation to the bottom wall of the passage 12 and over the grain-trough 16, whereby grain flowing from the rear end of the bottom part 31 falls into said trough. The grain-bottom 31 is slightly forwardly inclined so that grain will feed rearward down the same. The tailing-trough 18 is disposed below the grain-bottom 31 at the rear of its forward end, and the shaker-frame 20 is provided with what may be termed a tailing-bottom 32, which extends forward on an incline from a point over the trough 18 and below the forward end portion of the grain bottom 31. It is thus apparent that the bottom 31 combines with the partition parts 26 and 27 and grating 28 to form a passage 33, which is in longitudinal register with the auxiliary air blast passage 12, and the bottoms 31 and 32 coöperate to form a passage 34, which leads from a point over the tailing-trough 18 and merges at its forward end with the passage 33 into a passage 35 formed between the partition 27 and bottom 32. The forward end of the bottom 32 is inclined upward in advance of the forward end of the partition part 27 and the riddle pivots 22, 22, and extends upward a desired distance to direct the fine chaff and dust which are blown from the grain within the shaker-frame into the frame 1 in position to be carried out through the stacker with the straw. A gate 36 is pivoted in the forward portion of the passage 35 and is adjustable to regulate the force of the blast through said passage.

The operation of my improved grain cleaning means is as follows: When the machine is in operation the shaker-frame 20 has rapid shaking movements imparted thereto and the air blast from the fan 6 is directed through the main passage 11 into the shaker frame above the partition members 26 and 27 and through the riddles 21, a portion of said blast also passing over said riddles and under the forward end of the grain-bottom 2 to blow dust and chaff from the grain as it falls onto the riddles 21 from said grain-bottom. It is thus apparent that the cleaning of the grain by the air blast from the passage 11 continues during the passage of the grain from the grain-bottom 2 down through the riddles 21 and onto the partition parts 26 and 27. As the grain shakes through the grated bars or sieve means provided between the ends of the partition parts 26 and 27 and falls onto the grain-bottom 31 of the shaker-frame it is further cleaned by an air blast which is directed into the passage 33 of the shaker-frame from the auxiliary blast passage 12 of the fan housing, said blast being regulated by an adjusting of the gate 14. The cleaned grain, as it falls onto the bottom part 31 of the shaker-frame, passes rearward down the same and is delivered thereby to the grain-trough 16. The chaff and tailings which are blown from the grain both in the passage 33 and in the portion of the shaker-frame above the partition part 27, enter the passage 35 and the heavy particles thereof pass down said passage and through the part 34 into the tailing-trough 18, while the lighter particles thereof are blown forward into the machine and out through the stacker.

It is found in practice that my invention very materially facilitates the cleaning of grain and that the provision of the gates 14 and 36, which control the force of the blast through the lower or final cleaning passage of the shaker frame enable such blast to be regulated to a nicety so as to suit it to the size of the grain or seed operated on, it being necessary to reduce the force of the blast in proportion to the size of the grain or seed being threshed, a much lighter draft being required for clover or grass seed than for wheat or other grains.

I wish it understood that my invention is not limited to any specific construction, arrangement or form of the parts, as it is capable of numerous modifications without departing from the spirit of the claims.

Having thus described my invention, what I claim as new, and desire to secure by Letters Patent, is—

1. In a machine of the class described, a grain-trough and a tailing-trough, a shaker-frame having a grain-bottom and a tailing-bottom leading respectively to said grain and tailing-troughs and having means above said bottoms for delivering grain dropping therein to said grain-bottom and coöperating with both said bottoms to form a blast passage, and means for directing a blast through said passage and also over said grain directing means.

2. In a machine of the class described, a shaker-frame having a grain-bottom at its rear end and a tailing-bottom extending from a point below said grain-bottom and forward thereof in inclined relation and also having a plurality of riddles above said bottoms, a means above said bottoms for directing to the grain bottom grain falling thereon from said riddles and coöperating with both said bottoms to form a blast passage, and means for regulating the amount of blast directed through said passage.

3. In a machine of the class described, blast creating means having main and auxiliary blast discharge passages in superimposed relation, grain and tailing-troughs disposed below the plane of discharge of the blast from said means, a shaker-frame disposed in the path of discharge of air from said means and having main and auxiliary blast passages in register, respectively, with the main and auxiliary passages of said means, said shaker frame having separate grain and tailing-bottom parts which respectively direct grain and tailings to said grain and tailing-troughs and which form portions of the bottom wall of the auxiliary passage in said shaker frame.

4. In a machine of the class described, grain and tailing-troughs, a shaker-frame having separate grain and tailing-bottoms for delivering grain and tailings, respectively, to said troughs, a partition disposed over both said bottoms for directing grain falling thereon to said grain-bottom, a riddle carried by the frame over said partition, means for directing an air blast through said shaker-frame both above and below said partition, and means for regulating the passage of the blast through said frame below said partition.

5. In a machine of the class described, separate grain and tailing troughs, a shaker frame having separate grain and tailing bottoms in its lower portion for delivering grain and tailings, respectively, to said troughs and also having a plurality of riddles disposed above said bottoms, a partition disposed between said bottoms and riddles for catching the grain falling through said riddles, said partition having its opposite end portions oppositely inclined and provided with grain delivery openings adjacent to the inner ends of said inclines, said openings being disposed over the grain bottom, and means for directing an air blast in regulated proportions above and below said partition through said shaker frame.

In testimony whereof, I have hereunto signed my name to this specification.

HENRY H. SCHUETTE.

Copies of this patent may be obtained for five cents each, by addressing the "Commissioner of Patents, Washington, D. C."